March 13, 1945.   L. B. CAMPBELL   2,371,280
MACHINE FOR FORMING AND WELDING CHAINS
Filed April 22, 1942   8 Sheets-Sheet 1

INVENTOR
L. BARRETT CAMPBELL
BY
ATTORNEY

March 13, 1945.  L. B. CAMPBELL  2,371,280
MACHINE FOR FORMING AND WELDING CHAINS
Filed April 22, 1942  8 Sheets—Sheet 2

INVENTOR
L. BARRETT CAMPBELL
BY Frederick S. Dunlap
ATTORNEY

March 13, 1945.  L. B. CAMPBELL  2,371,280
MACHINE FOR FORMING AND WELDING CHAINS
Filed April 22, 1942  8 Sheets-Sheet 4

INVENTOR
L. BARRETT CAMPBELL
BY
ATTORNEY

March 13, 1945.  L. B. CAMPBELL  2,371,280
MACHINE FOR FORMING AND WELDING CHAINS
Filed April 22, 1942  8 Sheets-Sheet 5
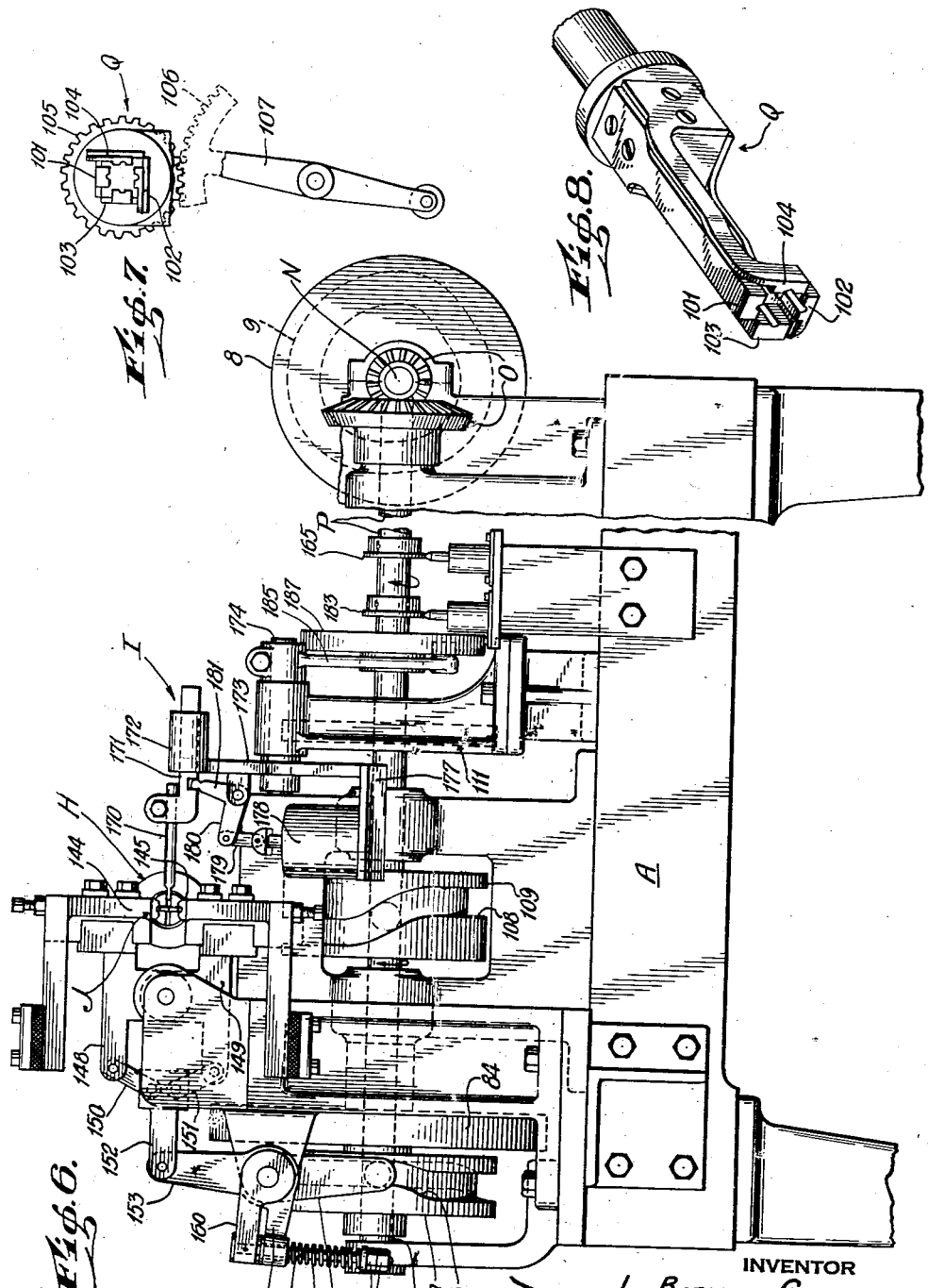
INVENTOR
L. BARRETT CAMPBELL
BY
ATTORNEY March 13, 1945.  L. B. CAMPBELL  2,371,280
MACHINE FOR FORMING AND WELDING CHAINS
Filed April 22, 1942  8 Sheets-Sheet 6
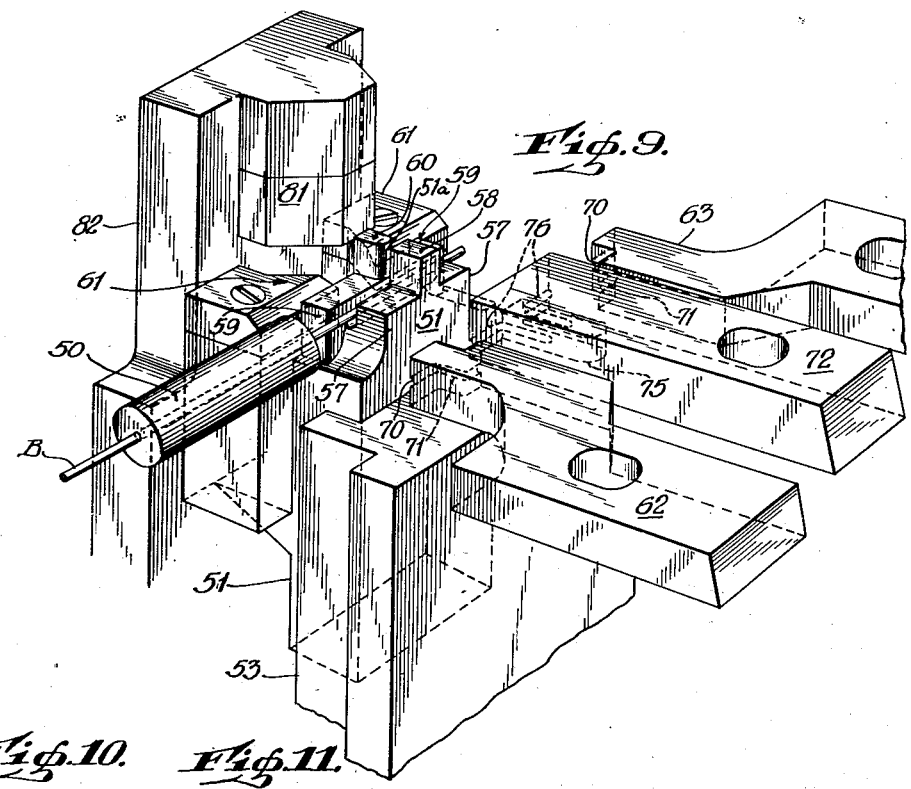
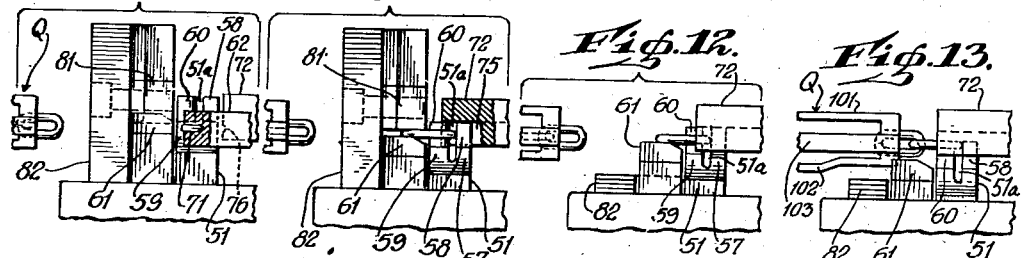
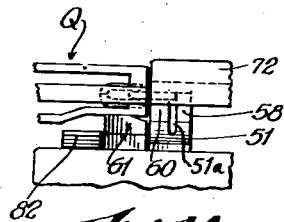
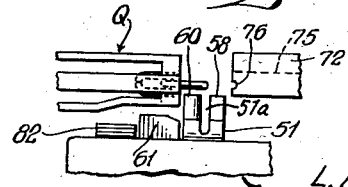
INVENTOR
L. BARRETT CAMPBELL
BY
ATTORNEY March 13, 1945.  L. B. CAMPBELL  2,371,280
MACHINE FOR FORMING AND WELDING CHAINS
Filed April 22, 1942  8 Sheets—Sheet 7
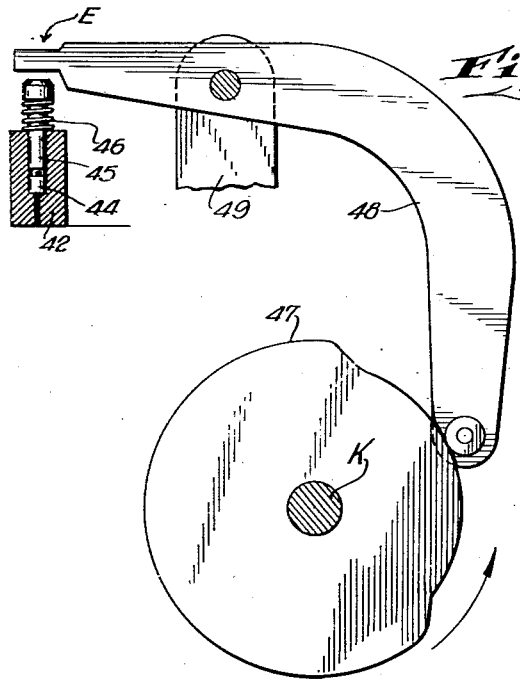
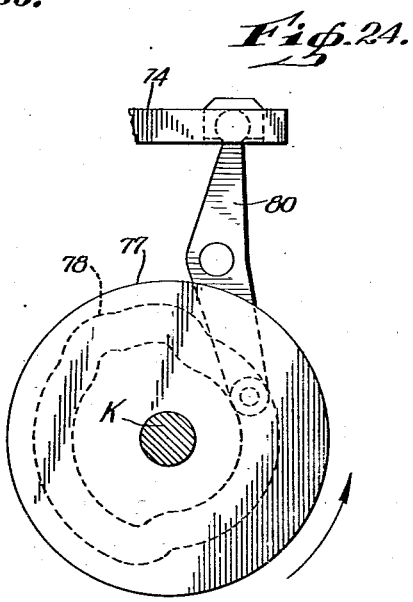
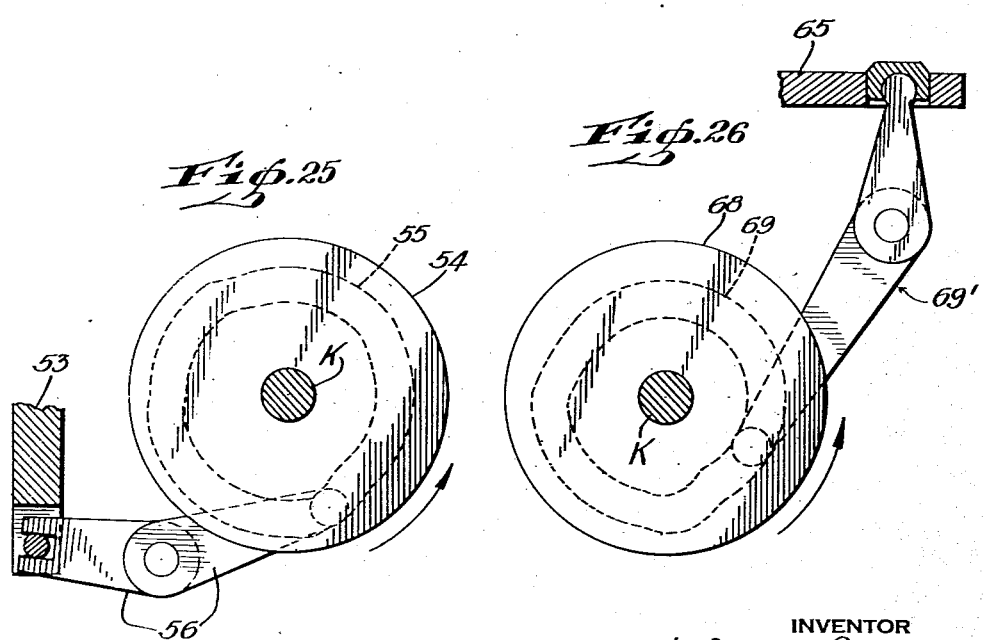
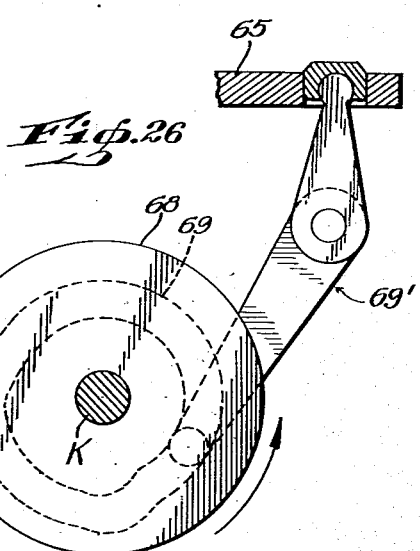
INVENTOR
L. BARRETT CAMPBELL
BY
Frederick S. Duncan
ATTORNEY March 13, 1945.                L. B. CAMPBELL                    2,371,280
                    MACHINE FOR FORMING AND WELDING CHAINS
                         Filed April 22, 1942          8 Sheets-Sheet 8

Patented Mar. 13, 1945

2,371,280

UNITED STATES PATENT OFFICE 2,371,280

MACHINE FOR FORMING AND WELDING CHAINS

Lyman Barrett Campbell, Waterbury, Conn., assignor to American Chain & Cable Company, Inc., Bridgeport, Conn., a corporation of New York Application April 22, 1942, Serial No. 440,081

9 Claims. (Cl. 59—18)

This invention relates to a machine for forming and welding chains.

The broad object of this invention is the provision of a machine for forming and connecting links in a chain and for welding the links of the chain in a continuous operation and at a high rate of speed.

Other objects of this invention consist in providing improved means for presenting the last formed link to receive a new link as it is being closed, and improved means for feeding and presenting the assembled links in succession to welding electrodes.

Other objects of this invention will appear from the following description taken in connection with the drawings, in which—

Fig. 6 shows the left end of the machine in elevation;

Fig. 7 is a front end view of the link handling fingers and the means for rotating the last formed link into position to receive the link being formed;

Fig. 8 is a perspective view of the link handling fingers;

Fig. 9 is a perspective view of the wire cutting, link forming, link trimming, and link closing mechanisms;

Fig. 10 shows the link handling fingers and the mechanism disclosed in Fig. 9 in the position they occupy after the wire cutting and the first forming operation;

Fig. 11 shows the position of the same parts after the second forming operation;

Fig. 12 shows the position of the same parts after the link trimming operation;

Fig. 13 shows the position of the same parts after the newly formed link has been closed and connected to the last formed link;

Fig. 14 shows the position of the same parts after the newly formed link has been seized by the link handling fingers;

Fig. 15 shows the king post or anvils lowered to clear the newly formed link to permit it to be withdrawn from the link forming region;

Fig. 16 shows the form of the link produced by movement of the parts into the positions shown in Fig. 10;

Fig. 17 shows the form of the link produced by movement of the parts into the position shown in Fig. 11;

Fig. 18 shows the link after the trimming operation has been performed by movement of the parts into the positions shown in Fig. 12;

Fig. 19 shows a closed link which is closed as the parts are moved into the position shown in Fig. 13;

Fig. 20 is a longitudinal, diametral section through the link turning mechanism located adjacent to the welding region;

Fig. 21 is a vertical transverse section on the line 21—21 of Fig. 20;

Fig. 22 is a vertical transverse section on the line 22—22 of Fig. 20;

Fig. 23 is a side view of the wire check operating cam and lever;

Fig. 24 is a side view of the hood or second former operating cam and lever;

Fig. 25 is a side view of the king post or anvil operating cam and lever;

Fig. 26 is a side view of the first former and cut-off operating cam and lever.

The machine disclosed comprises wire straightening mechanism, wire feeding mechanism, wire check feed mechanism, link forming and link closing mechanisms, and link welding mechanism, all correlated so as to automatically produce a finished welded chain from wire stock. All of the parts of the machine are shown at substantially 30° in the cycle of operation in the various figures except in Fig. 9 where they are shown at approximately 90° and in Figs. 10 to 15 where they are shown in further advanced positions in the cycle as will be explained later.

*The link and chain forming mechanism*

The frame A of the machine includes various platforms and standards on which the various elements of the machine are suitably supported and journaled. The supply of wire is preferably on a reel not disclosed which may be suitably supported on the frame of the machine. This wire indicated at B, Fig. 3, passes through any well known form of straightening mechanism C, into a wire feeding mechanism D, Figs. 3, 4, and 5, into a wire check feed mechanism E, Figs. 1, 3, and 23, and into a link forming mechanism indicated generally at F, Figs. 1, 2, and 3, details of which are shown in Figs. 7 to 15, 24 and 25 and 26.

The welding mechanism

Figure 1:
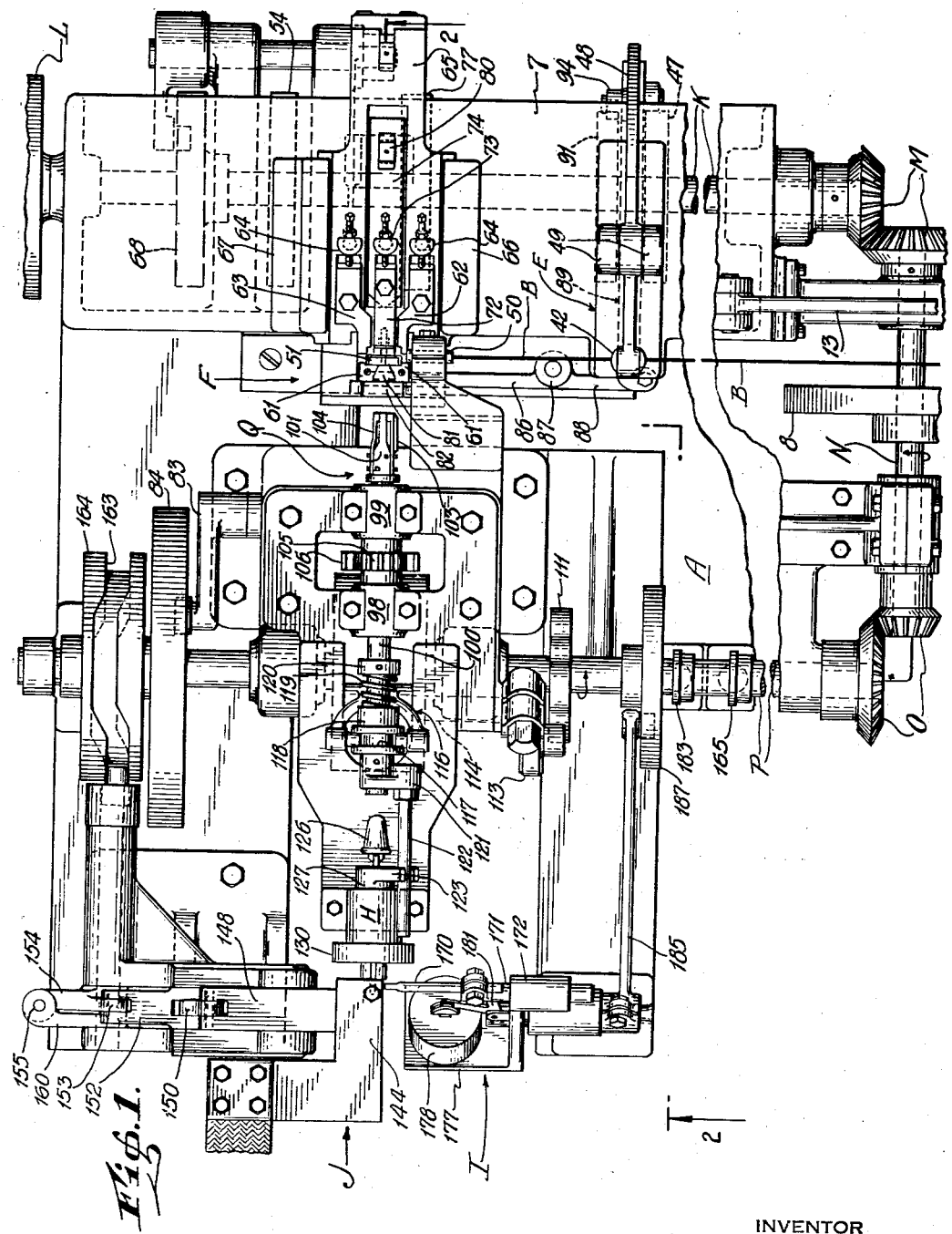
Fig. 1 is a top plan view of a machine constructed in accordance with my invention.
Figure 2:
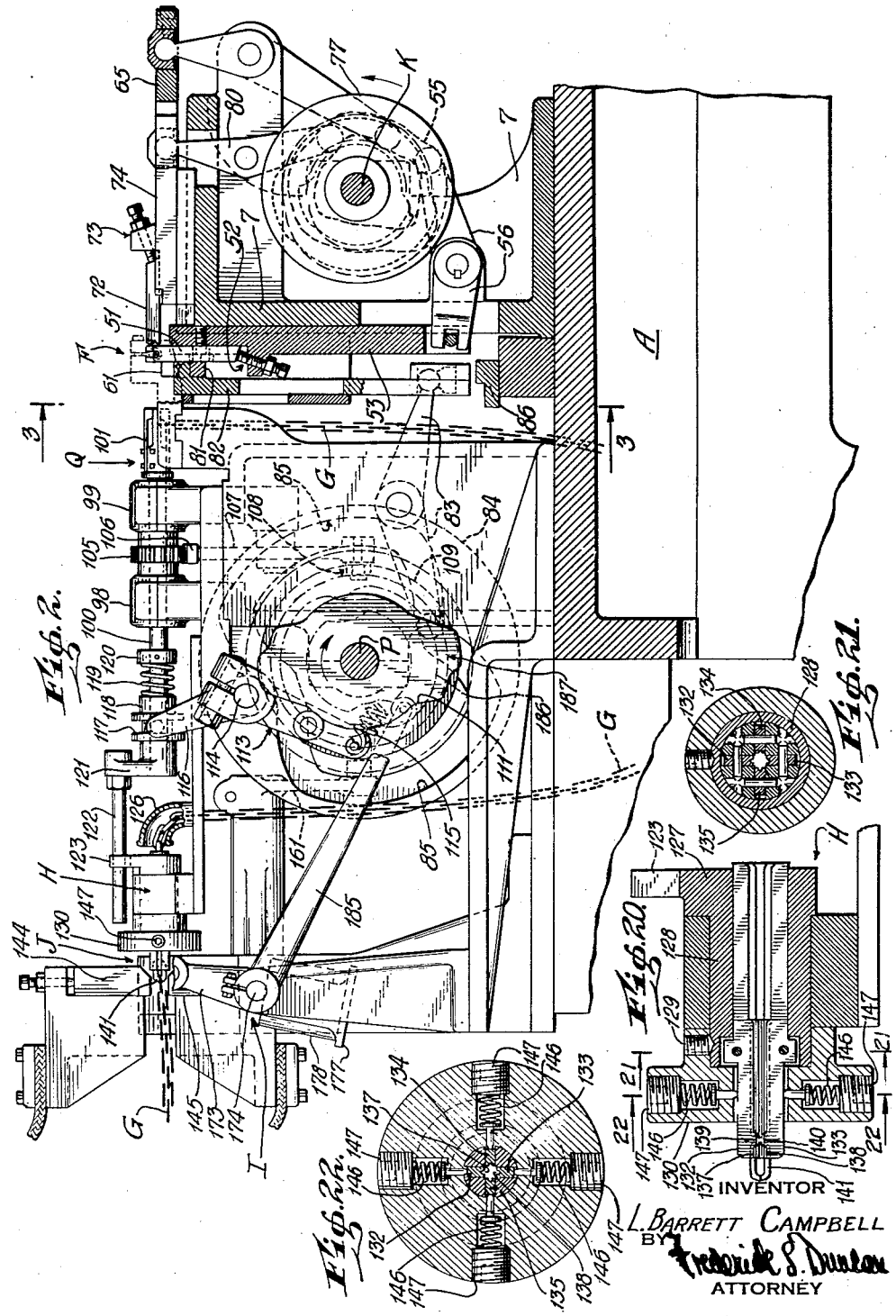
Fig. 2 is a vertical longitudinal section through the machine on the line 2—2 of Fig. 1.

The formed and connected but unwelded links in the chain G are drawn through the link turning mechanism H, Figs. 1, 2, 20, 21 and 22 by feeding mechanism I, Figs. 1, 2 and 6, into the welding mechanism J.

The driving shafts

Suitably supported and journaled on the right end of the machine frame is a shaft K, Figs. 1, 2, 3, 4, 5, 23, 24, 25 and 26, which may be driven from a source of power, not shown, through a pulley L, Fig. 1. This shaft through gears M, Figs. 1, 3 and 4, drives a transverse shaft N, Figs. 1, 3, 4 and 6 at the same rate of speed, which latter shaft through gears O, Figs. 1 and 6, drives a shaft P, Figs. 1, 2 and 6, paralleling the shaft K at half the rate of speed of the latter. The various elements of the link and chain forming mechanism are driven through cams mounted on all three shafts and the elements of the welding mechanism are driven through cams mounted on the shaft P.

Timing and cam diagram

Figure 27:
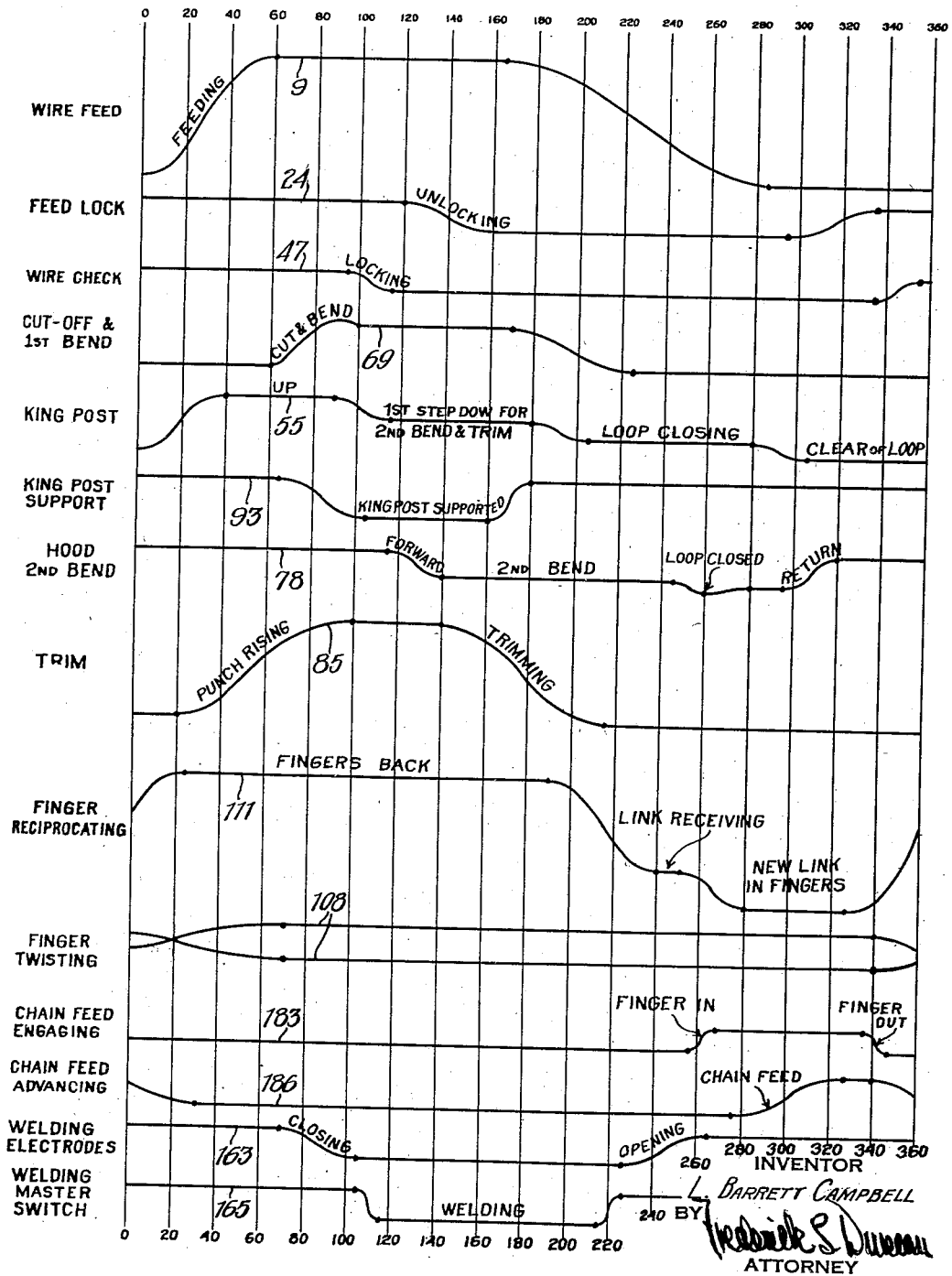
Fig. 27 is a timing or cam groove diagram.

Fig. 27 shows the cam grooves of the various cams developed with respect to one cycle of operation of the machine starting from the beginning of the cycle, showing the entire lengths of the cam surfaces of the cams mounted on the shafts K and N and one-half of the length of the cam surfaces of the cams mounted on the shaft P. This figure shows the timing relation of the various cam surfaces and will be referred to as the description continues.

Wire feeding mechanism

Figure 3:
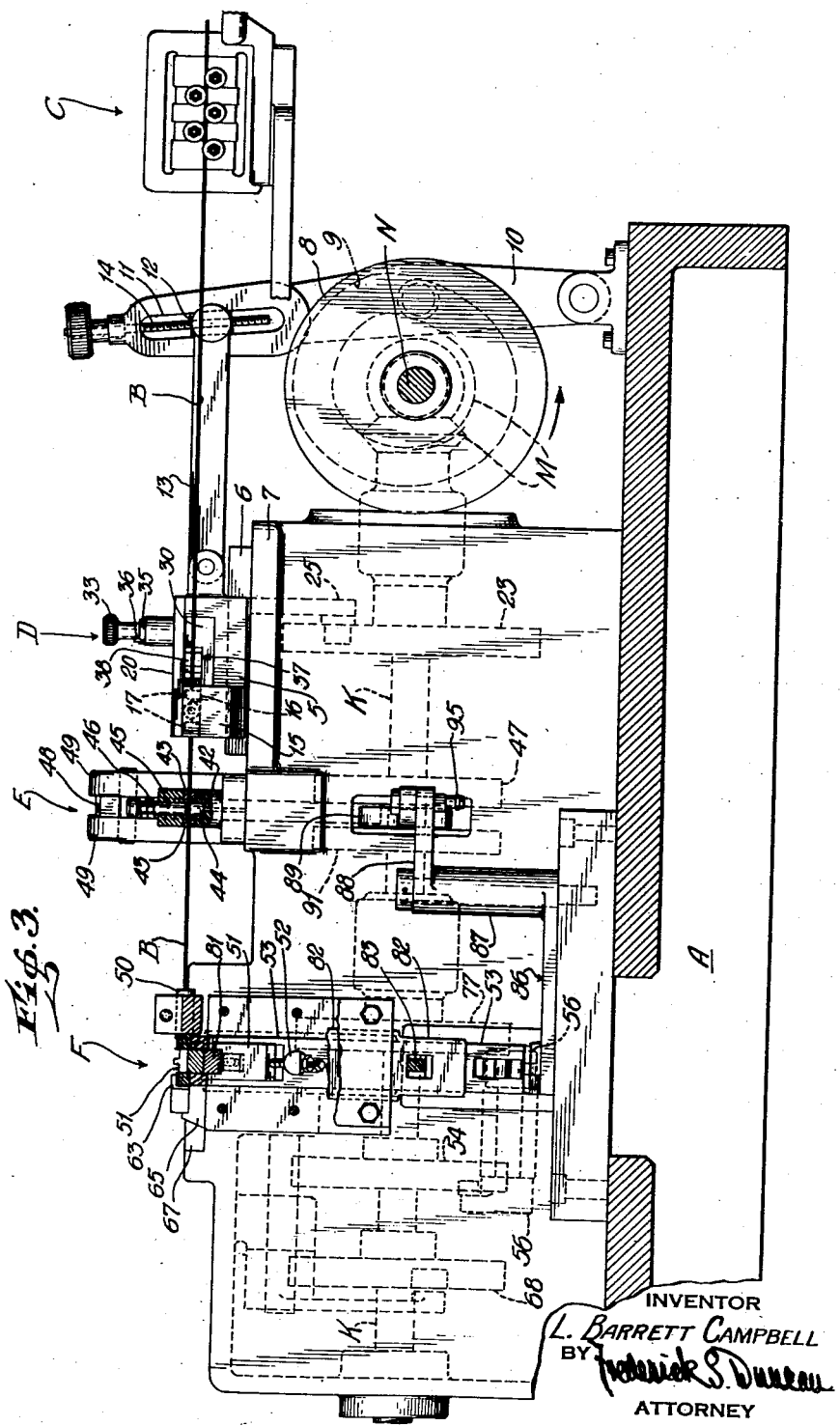
Fig. 3 is a vertical transverse section on the line 3—3 of Fig. 2.
Figures 4, 5:
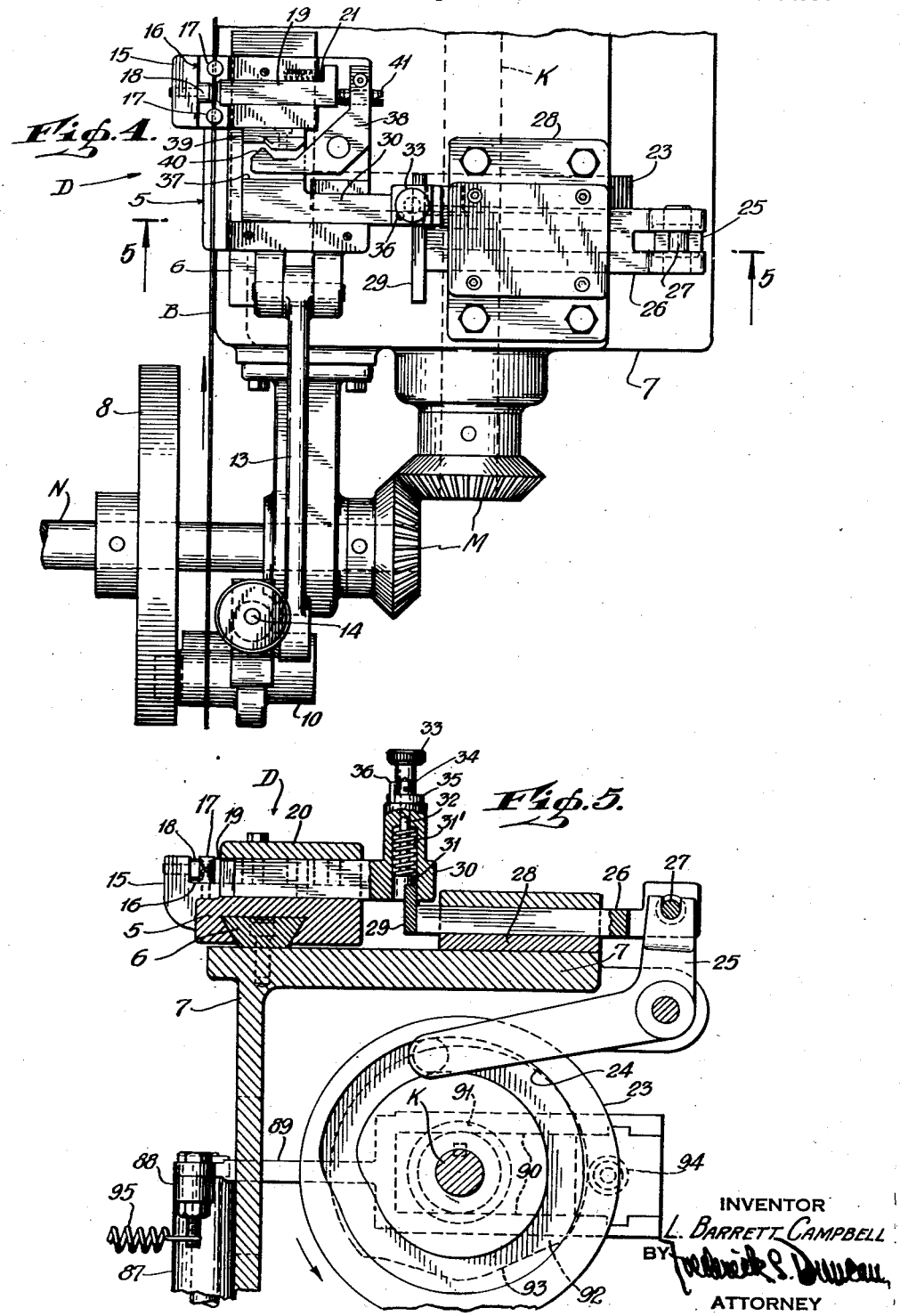
Fig. 4 is a top plan view of the wire feeding mechanism.
Fig. 5 is a vertical transverse section on the line 5—5 of Fig. 4.

The wire feeding mechanism, generally indicated at D, Figs. 3, 4, and 5, includes a wire feeding carriage 5 which has a dovetail engagement with a track 6 mounted on a platform 7 carried by the frame of the machine. The carriage is moved back and forward once during each cycle of operation of the machine by means of a box cam 8, Figs. 1, 3, 4 and 6, provided with a groove 9, see also Fig. 27, in which operates a roll on an arm 10 suitably pivoted at its lower end on the frame of the machine. The upper end of the arm 10 is slotted as indicated at 11 to slidably receive a block 12 connected by a link 13 to the feeding carriage 5. The position of the block 12 in the slot 11 may be adjusted by means of a rod 14 which is threaded in the block and which is rotatably supported on the upper end of the arm 10 by a suitable manipulating means. By this means the length of stroke of the feeding carriage 5 is adjusted.

The feeding carriage 5 is provided at its forward end, Figs. 4 and 5, with a lateral extension 15 which is grooved as indicated at 16. Supported in the bottom of the groove are wire guiding posts 17 for guiding the wire to be properly engaged by the gripping mechanism which includes a fixed gripping element 18 supported in the outer wall of the groove 16 intermediate of said guiding posts 17 and a movable gripping element or slide 19 which operates in a transverse groove in the carriage 5 and which is held in place by a cover plate 20. The slide 19 is urged into a disengaging position by a spring 21.

The slide 19 is operated by means of a box cam 23, Figs. 3 and 5, which is mounted on the shaft K and is provided with a cam groove 24, see Figs. 5 and 27, in which operates a roll carried by one arm of a bell crank lever 25, the other arm of which has its end reduced in width to fit between ears on a slide 26, Figs. 4 and 5, and which is transversely grooved to receive a pin 27 supported in said ears. This slide 26 operates in a groove in a block 28 secured to the platform 7 and is retained therein by a cover-plate as indicated. The inner end of the slide 26 is provided with a connecting bar 29 extending in the direction of the movement of the carriage 5 and upwardly into a groove of greater width than that of the bar and formed in a slide 30 mounted in a transverse groove in the carriage 5.

Interposed between one side of the bar 29 and one wall of the groove in slide 30 is a block 31 spring pressed into functioning position by a spring 31' mounted in an upwardly extending housing on the slide 30. Connected to the block 31 is a rod 32 which projects through the upper end of the housing and is equipped with a manipulative head 33 to which it is connected by means of a cross pin 34. The head 33 is provided with an interrupted flange 35 receiving a pin 36 on the housing. The block 31 may be raised and rotated and the flange lowered on top of the pin 36 to hold the block in inoperative position. The slide 30 is held in the groove in the carriage 5 by the plate 20 before referred to.

The slide 30 is provided with a transverse groove 37 in which operates one end of a bell crank lever 38 pivoted on the carriage 5. One wall of the groove and said end of the bell crank lever are provided with cooperating cam surfaces 39 and 40 whereby the slide 30 as it is moved to the left in Fig. 4 rocks the bell crank lever 38 counterclockwise to actuate the wire gripping slide 19 to grip the wire. Threaded into the other end of the bell crank lever is an adjusting screw 41 which bears against the outer end of the wire gripping slide 19. Movement is transmitted from the slide 26 to the slide 30 regardless of the position of the carriage 5 to move the slide 19 to grip the wire and connect it to the carriage. As is apparent from Fig. 27 the wire is gripped when the machine is at rest at the beginning of a cycle and shortly thereafter the carriage is moved to feed the wire. After the wire has been fed and gripped by a wire check mechanism about to be described, the wire is released by the wire gripping slide 19, the carriage is returned to its home position, and the gripping device on the carriage is again operated to grip the wire and connect it to the carriage.

Wire check

Mechanism is provided to grip the wire and to hold it in its forwardly fed position. Mounted on the platform 7, Figs. 1 and 3, is an upwardly projecting cylindrical member 42 provided with a transverse through hole in which are mounted wire guiding inserts 43 and with an axial hole extending below said inserts and constituting a seat for a wire gripping insert 44 and a guide for a gripping plunger 45 which is normally held in raised position by a spring 46. After the wire has been fed the plunger is depressed by means of a face cam 47, see also Figs. 1, 3 and 23, on the shaft K the cam face of which cooperates with a roll on a curved lever 48 mounted between lugs 49 projecting from the platform 7. The cam 47 (see also Fig. 27) is shaped so as to depress the plunger after the wire has been fed forwardly by the carriage 5 and before the wire is released from the carriage.

Cutoff bushing

The wire is fed forwardly through a cutoff bushing 50 Figs. 1, 3, and 9 which is adjustably clamped in position on the frame of the machine by suitable clamping means as indicated.

Cutoff and forming mechanism

The length of wire fed forwardly during each feeding operation is slightly greater than the length of wire in a completed link and as disclosed more particularly in Fig. 9 the forward end of the wire is fed through a groove 51a in the upper end of a king post which comprises a hardened block 51 adjustably mounted as indicated at 52 Figs. 2 and 3 on an operating slide 53 operated by a box cam 54 Fig. 25 mounted on the cam shaft K and provided with a groove 55 receiving a roll on one end of a bell crank construction 56 suitably pivoted on the frame of the machine. The cam groove is shaped, see also Fig. 27, so that it will raise the king post from a slightly raised position to its highest position at the beginning of the cycle of operation of the machine and then lower the king post step by step at spaced intervals for reasons that will appear later in the description.

In Fig. 9 the king post is shown in its raised position at approximately 90° in the cycle of operation. The groove 51a divides the king post block 51 into front and rear sections, the rear section having a lower relatively wide portion 57 and an upper narrow portion 58 the function of which will be referred to later, and the front section having a lower wide anvil 59 of a width slightly less than twice the inside length of the link to be formed and an upper narrow anvil 60 which is of a width equal to the inside width of the link to be formed. The king post block 51 also supports spaced trimming dies 61 later referred to, for trimming the ends of a link before it is closed. When the machine is at rest at the beginning of a cycle, the king post will be in its lowermost position, see Fig. 27.

Mounted for cooperation with the lower wide anvil 59 is a pair of forming dies 62 and 63 Figs. 1, 3, 9 and 10 which are adjustably mounted as indicated at 64 on the laterally spaced legs of a slide 65, see also Fig. 26, slidably retained on the platform 7 by overhanging guides 66 and 67. The slide 65 is operated by means of a box cam 68, Fig. 26, mounted on the shaft K and provided with a cam groove 69, which cooperates with a roll on the lower arm of a bell crank 69' which has its upper arm pivotally engaging the slide. The cam groove, see also Fig. 27, is shaped so as to move the forming dies 62 and 63 forwardly to their extreme forward position and then to slightly move them rearwardly and later in the operation after the link has been engaged by a second forming die, to move them to their extreme rear position. The forward ends and inner sides of the dies 62 and 63 are provided with wire receiving grooves 70 and 71. The outer corner of the die 62 cooperates with the cutoff bushing 50 to cut off the wire.

Mounted for cooperation with the upper narrow anvil 60 is a hood or forming die 72 Figs. 1 and 9 to 15 adjustably mounted as indicated at 73 on a slide 74, see also Fig. 24, supported on the platform 7. The forming die 72 is provided with a recess 75 to clear the narrow portion 58 on the block 51. The forward end of the die 72 and the side walls of the recess are provided with a groove 76 to receive the partially formed link. This slide is operated by a box cam 77 Fig. 24 provided with a cam groove 78 in which operates a roll carried by one arm of a lever 80, the other arm of which has a pivotal engagement with the slide. The cam groove is so shaped, see also Fig. 27, that the hood will be moved forwardly to perform a second link bending operation and then after the link has been trimmed, moved forwardly to its most forward position to complete the link bending operation and to close the link, and then it will be partly withdrawn and finally moved back to its rearmost position which position it occupies when the machine is at rest.

Link trimming mechanism

Cooperating with the trimming dies 61, Figs. 9 to 15, is a punch 81 carried by a slide 82, see also Figs. 1, 2, and 3, which is reciprocated by a lever 83 suitably pivoted on the frame of the machine and operated by a double box cam 84 on the shaft P. This box cam is provided with a cam groove 85 shaped as shown in Figs. 2 and 27 to operate the trimming die twice during each rotation of the shaft P and once during each cycle of operation of the machine. The cam is timed to operate after the second forming operation, see Figs. 27 and 11 and 12.

King post support

The king post slide 53 is supported during the trimming operation by an arm 86, Figs. 1, 2 and 3, provided with a raised portion adapted to be moved under the king post slide 53. This arm is formed on the lower end of a hub 87 Fig. 3 suitably pivoted on the frame. The upper end of the hub is provided with an arm 88, see also Fig. 5, to which is pivoted a slide 89 provided with a wide slot 90 to receive the shaft K. The side walls of the slot may slide in a groove 91 on the hub of the face cam 92 which is provided with a cam face 93 engaged by a roll 94 on the slide 89, the roll being held in contact with the face of the cam by a spring 95. The mechanism so far described will form and close links and provision is made so that the newly formed link as it is being closed is connected to the last formed link. This mechanism comprises link handling mechanism.

Link handling mechanism

For the purpose of holding the last formed link and for presenting it to the link forming mechanism at the time the newly formed link is closed, I provide an improved link handling mechanism Q Figs. 1, 2, 7, 8, and 10 to 15 which is mounted for reciprocation toward and away from the link forming region and also for rotation for the purpose of turning the last formed link angularly into position so it may be engaged by the newly formed link as it is being closed. Supported in spaced uprights 98 and 99 Figs. 1 and 2 for rotation and axial movement is a shaft 100 which is provided at its ends which is adjacent to the link forming mechanism with pairs of opposed spring fingers 101, 102 and 103, 104, see also Figs. 7 and 8. The fingers 102 and 104 are offset as disclosed in Fig. 8 to provide an opening through which the formed chain may leave the link handling fingers.

Mounted on the shaft 100 between the uprights 98 and 99 for rotation with the shaft and permitting relative axial movement of the shaft with respect thereto, is a gear 105 Figs. 1, 2, and 7 which is operated by a segmental gear or rack 106 on one end of a lever 107 suitably pivoted on the frame of the machine, the other end of which is provided with a roll engaging a groove 108 in a box cam 109, see also Fig. 6, mounted on the shaft P. The cam groove, see also Fig. 27, is shaped to rock the shaft through an angle of 90° back and forth once during each rotation of the shaft P, that is, to rock 90° in one direction during one cycle of operation of the machine and 90° in the opposite direction during the next cycle. This is for the purpose of rocking the last formed link through an angle of 90° to present it to receive the link being formed. Fig. 27 shows the complemental halves of the cam groove 108 superimposed.

For the purpose of moving the shaft 100 axially so as to present the last formed link to the link forming mechanism and to seize the newly formed link and to withdraw it from the link forming region, there is provided a face cam 111 Fig. 2 which is mounted on the shaft P. The face of the cam is shaped, see also Fig. 27, to cause the shaft and link handling fingers to be moved to the right to present the last formed link in position to receive the link being formed and then to move the fingers further to the right to seize the newly formed link and then to move the fingers to the left to withdraw the newly formed link from the link forming region. Cooperating with the cam face of this cam is a roll on an arm 113 which is connected to a shaft 114 journaled in the frame of the machine. The roll is pressed against the face of the cam by means of a spring 115. Secured on the other end of the shaft 114 is a bifurcated arm 116 which is provided with pins which extend into a groove 117 in a sleeve 118 slidable and rotatable on the shaft 100. Motion is communicated from the sleeve 118 to the shaft 100 by means of a spring 119, interposed between and connected to the sleeve and a collar 120 pinned to the shaft. The left hand end of the sleeve is provided with an arm 121 in which is mounted a rod 122 which slidably engages an arm 123 on the link turning mechanism H which will be described later.

Operation of the link forming mechanism

In the position of rest at the end of a cycle of operation of the machine the wire feed carriage is in its rearmost position. The wire is gripped by the gripping means on the carriage, the wire check means is released, the dies which cut off the wire and perform the first bending operation are in their rearmost position, the king post is in its lowermost position, the king post support is out of supporting position, the hood or die that performs the second and third bending operations is in its rearmost position, the trimming die is in its lowermost position, the link handling finger mechanism is in intermediate positions as to both reciprocating and turning movements.

As the machine is set in operation the reciprocating and turning movements of the link handling fingers are completed and then the wire is fed forward and the king post and block 51 are raised. This is the position of the parts shown in Fig. 9. The cutoff and forming dies 62 and 63 are then moved forward into the position shown in Fig. 10 producing the low wide U link form shown in Fig. 16. At this time the king post support is rocked into supporting position. The dies 62 and 63 are then moved slightly toward the rear just far enough to permit movement of the king post but still in position to support the partially formed link after which the king post is lowered to present the upper anvil 60 opposite the partially formed link. The wire check is applied and the feed lock is released and the feed carriage is moved into its rearmost position.

After the king post has been lowered as described, the hood 72 is moved forward into the position shown in Fig. 11 producing the partially formed link disclosed in Fig. 17. The trimming punch 81 is then lowered into the position shown in Fig. 12 to cut off the ends of the link as shown in Fig. 18 and then the king post support is withdrawn, after which the link handling fingers are moved forward into the position shown in Fig. 13. The hood 72 is moved forward to the extreme forward position disclosed in Fig. 13 during which movement it closes the link as shown in Fig. 19 connecting the newly formed link with the link formed during the preceding cycle of operation. The link handling fingers are then moved forwardly to seize the newly formed link which is held stationary by the narrow projecting portion 58 on the king post block 51. During this movement the previously formed link will be engaged by the upper narrow anvil 60 and will be pushed back through the fingers of the link handling mechanism as disclosed in Fig. 14. Following this operation the king post will be lowered and withdrawn from the newly formed link to permit the finger handling mechanism to withdraw the newly formed link from the link forming region as disclosed in Fig. 15.

Welding mechanism

By means of the mechanism described links are formed and connected into a chain G until a sufficient length of chain has been formed to reach to the welding mechanism J, Figs. 1, 2 and 3. This length of chain may drop down under the shaft P and then pass through a curved tubular guide 126 Fig. 2 and into the link turning mechanism H adjacent to the welding region. This mechanism H, see also Figs. 20, 21 and 22, comprises a composite cylinder consisting of an inner cylindrical member 127 on which the arm 123 before described is formed and this inner member has a reduced cylindrical portion 128 removably held by a set screw 129 in a cylindrical opening in a second cylindrical member 130 of the cylinder. Pivoted in the first member 127 of the cylinder are two pairs of link holding and link guiding members 132, 133, and 134, 135. The link holding and link guiding members are provided with opposed grooves as disclosed through which the links are moved by a chain feeding mechanism later to be described. These grooves, see grooves 137 and 138 of the members 132 and 133, are interrupted at their ends adjacent to the welding mechanism J as indicated at 139 and 140 forming projections which engage between alternate links of the chain and hold the link 141 about to emerge from the link turning mechanism H in position to be engaged by the welding electrodes 144 and 145. Springs 146 are provided to press the grooved ends of the pivoted members into frictional engagement with the links and these springs may be adjusted by screw threaded members 147 as is apparent from Figs. 20 and 22. By means of the mechanism described the link turning mechanism H at the welding region is turned with the link handling finger mechanism Q adjacent to the link forming region of the machine so that both ends of the chain G are turned at the same time and to the same amounts and in the same direction, and successive links fed through the link turning mechanism H are presented in a vertical plane to the welding electrodes 144 and 145. This is done at the beginning of a cycle of an operation.

Welding electrodes

The welding electrodes 144 and 145, Figs. 1, 2 and 6, are carried on the front ends of levers 148 and 149 pivoted on a common center on the frame of the machine. The rear or operating ends of these levers are connected by links 150 and 151 to the head of a link 152 pivoted to one arm 153 of a bell crank pivoted on the frame of the machine, the other arm 154 of which is provided with an aperture through which passes a rod 155 on which is mounted a spring 156 located between said arm 154 and nuts 157 threaded on the lower end of the rod 155. The upper end of the rod passes through and its head bears on an arm 160 of a second bell crank construction which includes an arm 161 provided with a roll which operates in a cam groove 163 in a drum cam 164 on the shaft P. This drum cam groove is shaped to reciprocate the electrodes back and forth twice during each rotation of the shaft P, that is, once during each cycle of operation of the machine and to bring the electrodes together as indicated in Fig. 27 shortly after the link has been turned by the turning mechanism H to bring the link into the plane of the electrodes. These electrodes are kept in this position until after the welding operation has been performed, the welding current through the electrodes being controlled by a welding master switch, not disclosed, timed to operate substantially in the relation disclosed in Fig. 27.

Welding current control

This welding master switch is a well known device that may be bought on the market and it functions to control the length of time during which the welding current is applied. This welding master switch may be under control of a face cam 165, Figs. 1 and 6, mounted on the shaft P and which is of such shape so as to throw the master switch into operation at the proper time and to permit it to be released under its own controlling mechanism at the proper time twice during each rotation of the shaft P and once during each cycle of operation of the machine.

Chain feeding mechanism

Means is provided to feed the chain through the link turning mechanism H into the space between the electrodes. This comprises a feeding finger 170, Figs. 1 and 6. This finger is adjustably clamped to a rod 171 which slides in an elongated bearing 172 on the upper end of the lever 173, see also Fig. 2, connected to a rod 174 suitably journaled in the frame of the machine. The lower end of the lever carries a supporting plate 177 for a solenoid 178, the core of which is connected by a link 179 to one arm of a bell crank 180 pivoted on the lever 173 and which has its other arm 181 in driving engagement with the sliding rod 171. This solenoid 178 may be energized under the control of a cam 182 on the shaft P shaped as shown in Fig. 27 to engage the finger 170 with the welded link of the chain before the feeding operation and to disengage it from the link of the chain after the feeding operation.

The finger 170 is moved horizontally to feed the chain by movement of the lever 173 which as stated before is connected to the rod 174. For this purpose the other end of the rod 174 is provided with an operating arm 185, Figs. 1, 2 and 6, which carries a roll Fig. 2 which operates in a cam groove 186 in a box cam 187 mounted on the shaft P. As disclosed in Fig. 27 after the welding electrodes have been withdrawn from welding engagement with a link, the feeding finger 170 is moved into engagement with the welded link by the solenoid 178 under control of the cam 182 and thereafter the feeding finger is moved horizontally toward the left, Figs. 1, 2 and 6, to feed the chain a distance equal to the length of one link and thereafter the finger is disengaged from the link and at the end of a cycle of operation of the machine the finger is moved toward the right into its home position which movement is completed at the beginning of the next cycle of operation.

The machine described forms links and connects them in a chain and welds the links at much greater speed than heretofore possible. By providing two pairs of link seizing and handling fingers at the link forming end of the machine, I am enabled to seize and turn the last formed link to receive the link being formed by rocking the fingers but once during each cycle of operation of the machine, thereby reducing the total time consumed in forming and assembling the links. In my machine the welding mechanism is far removed from the link forming mechanism so that the flash from the weld does not get into the slides of the link forming mechanism as would be the case if the links were welded in the link forming region.

While I have shown and described for purposes of disclosure, one embodiment of my invention, it is to be understood that I reserve the right to all such modifications and variations as fall within the principles of my invention and the scope of the appended claims.

I claim:

1. In a chain forming mechanism, the combination of link forming means, of link seizing and link turning mechanism comprising two pairs of opposed spring fingers, a rockable and slidable shaft supporting said spring fingers radially spaced from the axis of said shaft, means for sliding said shaft to present a formed link to receive a link as it is being formed, to seize the latter link after it has been formed, and to withdraw the newly formed link from the link forming region, and means for rocking said shaft once for each cycle of operation of the machine to turn the last formed link into position to receive a link as it is being formed.

2. In a chain forming mechanism, the combination of link forming means, of link seizing and link turning mechanism comprising two pairs of opposed spring fingers, a rockable and slidable shaft supporting said spring fingers radially spaced from the axis of said shaft, means for sliding said shaft to present a formed link to receive a link as it is being formed, to seize the latter link after it has been formed, and to withdraw the newly formed link from the link forming region, and means for rocking said shaft once during each cycle of operation of the machine to turn the last formed link into position to receive a link as it is being formed, said spring fingers comprising grooved link-seizing free end portions, the intermediate portions of two of the adjacent spring fingers lying in planes through the axis of the shaft and through the grooves in said fingers and the intermediate portions of the other of said fingers lying outside of planes through the axis of the shaft and the grooves in the fingers and lying adjacent to the spring portions of the first mentioned fingers to provide an opening for the passage of the chain as the link disengages said seizing portions of said spring fingers.

3. In a machine for forming links and assembling the links in a chain, a link seizing and link handling mechanism comprising a shaft, two pairs of opposed link seizing fingers supported in angularly spaced relation about the end of said shaft and extending in a direction generally parallel with the axis of said shaft, the intermediate portions of two of the adjacent fingers of the respective pairs of fingers being curved away from each other to provide an opening for the passage of the formed chain.

4. The combination in a machine of the character described of mechanism for forming links and assembling them successively in a chain, said mechanism including link seizing and turning means, mechanism for successively welding the links of the chain so formed comprising a pair of electrodes and link guiding and turning means for presenting successive links to said electrodes, and means for rocking said link seizing and turning means and said link guiding and turning means in the same directions and the same amounts during each cycle of operation of the machine.

5. The combination in a machine of the character described of mechanism for forming links and assembling them successively in a chain, said mechanism including link seizing and turning means, mechanism for successively welding the links of the chain so formed comprising a pair of electrodes and link guiding and turning means for presenting successive links to said electrodes, means for rocking said link seizing and turning means and said link guiding and turning means in the same directions and the same amounts during each cycle of operation of the machine, said means comprising a shaft on which said link seizing and turning means is mounted, means for moving said shaft axially toward and away from the link forming region, and means providing a sliding non-rotatable connection between said shaft and said link guiding and turning means.

6. In a welding mechanism comprising a pair of welding electrodes, means for guiding and feeding and presenting successive links of a chain to said electrodes comprising a chain guide provided with pairs of guiding elements arranged about an axis, said elements being in the form of pivoted levers provided on their inner sides with grooves interrupted near their ends and adjacent to said welding electrodes for holding a link between said electrodes, spring means for pressing said ends toward each other, means for rocking said guiding means to present successive links in the plane of said electrodes and means for feeding said links successively into welding position between said electrodes.

7. In a welding mechanism comprising a pair of welding electrodes, means for guiding and feeding and presenting successive links of a chain to said electrodes comprising a chain guide provided with pairs of guiding elements arranged about an axis, said elements being in the form of pivoted levers provided on their inner sides with grooves interrupted near their ends and adjacent to said welding electrodes for holding a link between said electrodes, spring means for pressing said ends toward each other, means for rocking said guiding means to present successive links in the plane of said electrodes, means for feeding said links successively into welding position between said electrodes, said last mentioned means comprising a finger adapted to engage the link last welded and to move the next link to be welded into welding position, means for moving said finger into and out of said link and means for moving said finger toward and away from said link guiding means.

8. In a chain forming machine, the combination of link forming means, of link seizing and link turning means comprising two gripping means disposed angularly about its axis, means for moving said link gripping means axially toward said link forming means to present a formed link to receive a link as it is being formed, to seize the latter link after it has been formed and to withdraw the newly formed link from the link forming means, and means for rocking said link seizing and link turning means about its axis once only for each cycle of operation of the link forming means to turn the last formed link into position to receive a link as it is being formed.

9. The combination in a machine of the character described of mechanism for forming links and assembling them successively in a chain, said mechanism including link seizing and turning means, mechanism for successively welding the links of the chain so formed comprising welding means and link guiding and turning means for presenting successive links to said link welding means and means for simultaneously rocking said link seizing and turning means and said link guiding and turning means about their axes in one and the same direction, once only for each cycle of operation of the machine and in opposite directions during successive cycles of operation of the machine.

L. BARRETT CAMPBELL.